United States Patent [19]
Alberti

[11] 3,906,870
[45] Sept. 23, 1975

[54] RETRACTABLE CARGO RESTRAINT AND CENTER GUIDE FOR CARGO COMPARTMENTS

[75] Inventor: John Alberti, Seattle, Wash.
[73] Assignee: The Boeing Company, Seattle, Wash.
[22] Filed: June 24, 1974
[21] Appl. No.: 482,594

[52] U.S. Cl.............. 105/464; 105/469; 244/137 R
[51] Int. Cl.².... B60P 7/08; B61D 45/00; B65J 1/22
[58] Field of Search ....... 105/366 A, 463, 464, 465, 105/369 A; 296/35 A; 244/137 R; 280/179 R

[56] References Cited
UNITED STATES PATENTS

| | | | |
|---|---|---|---|
| 3,210,038 | 10/1965 | Bader et al. | 105/464 |
| 3,306,234 | 2/1967 | Hansen | 105/369 R |
| 3,306,234 | 2/1967 | Hansen et al. | 105/465 X |
| 3,381,921 | 5/1968 | McDonough et al. | 244/137 R X |
| 3,556,458 | 1/1971 | Erith | 105/465 |
| 3,586,286 | 6/1971 | Pratt | 105/465 |
| 3,614,153 | 10/1971 | Tantlinger | 296/35 A |
| 3,641,940 | 2/1972 | Evans | 105/369 A |
| 3,741,504 | 6/1973 | Alberti | 244/137 R |

Primary Examiner—J. Franklin Foss
Attorney, Agent, or Firm—Christensen, O'Connor, Garrison & Havelka

[57] ABSTRACT

A cargo handling system for carriers, especially useful for freight carrying aircraft, incorporating retractable cargo restraints and cargo guide means utilized in cooperation with side manually engaged fore and aft locking device and with other cargo fixtures. During loading the retractable cargo restraints and center guide means are retracted into the floor of the cargo compartment for loading of a first row of cargo carrying pallets or containers entering the cargo compartment through the front or side of the compartment. The retractable cargo restraints may be erected for each pallet or container as needed to restrain vertical as well as fore and aft movement of the cargo. Upon completion of the filling of the first longitudinal row of cargo containers or pallets the retractable center guide means are erected and locked into position. A second row of cargo containing pallets or containers is then brought into the cargo compartment through one of the loading entrances thereof and may abut upon rollers, preferably cushioned, carried by the retractable center guide means. The cargo is then rolled into position and fastened to cargo restraints. The retractable cargo restraints and center guide means may be attached directly to a pair of permanently mounted tracks in the floor of the cargo compartment and may be removably secured so that the entire apparatus can be readily removed from the cargo compartment. The retractable cargo restraint and center guide means may contain casters or rollers for supporting and transporting cargo into its position. The retractable cargo restraint and retractable center guide means each have means to receive the restraint in its retracted position, means to permit rotation upwardly and means to lock the unit in its erected position for use.

19 Claims, 17 Drawing Figures

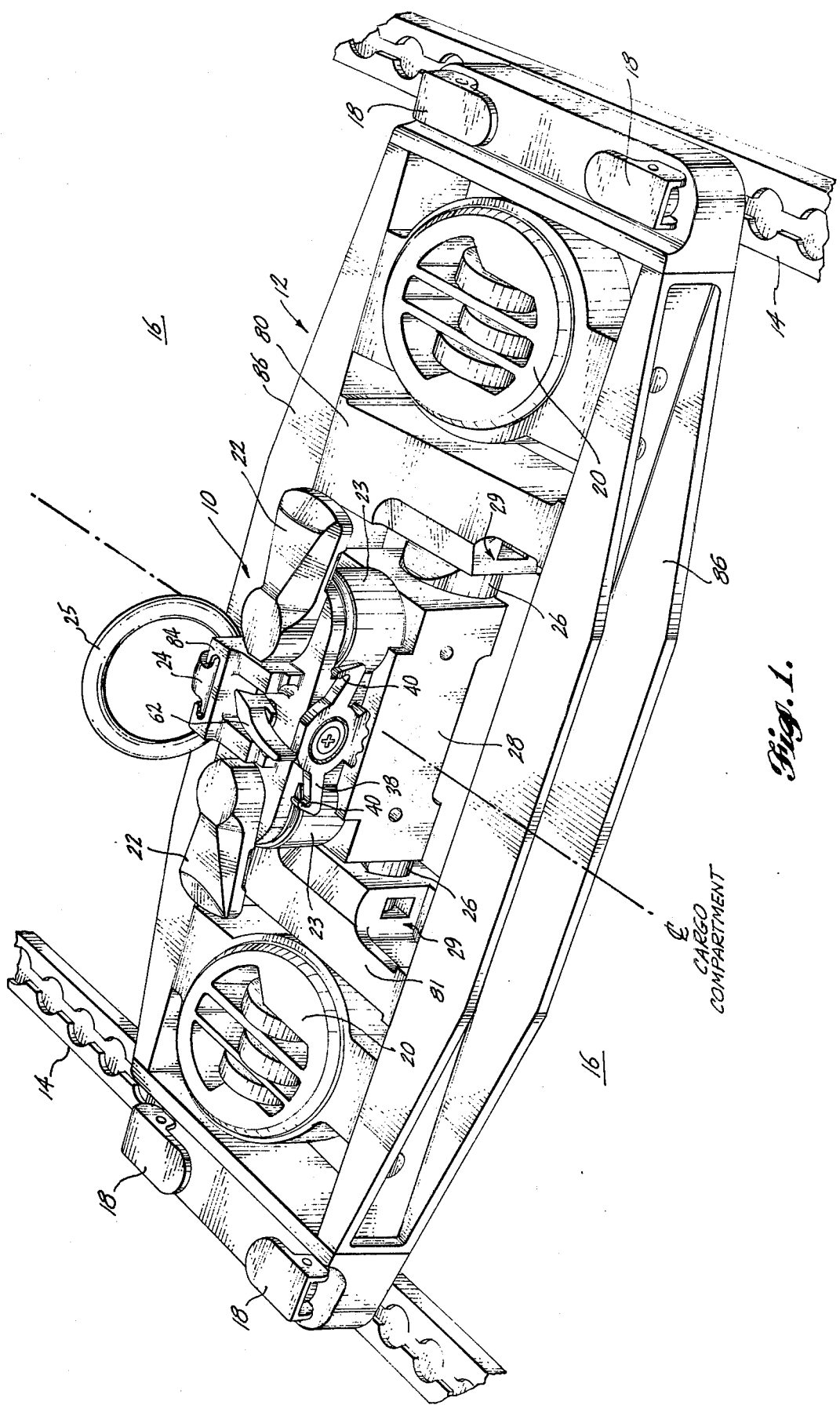

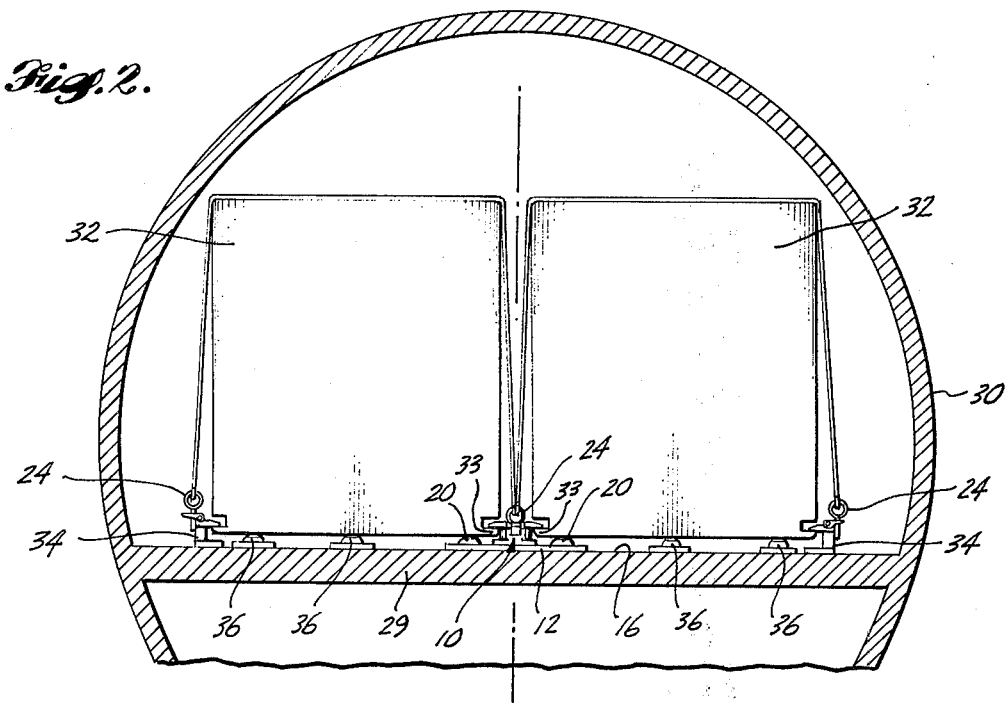
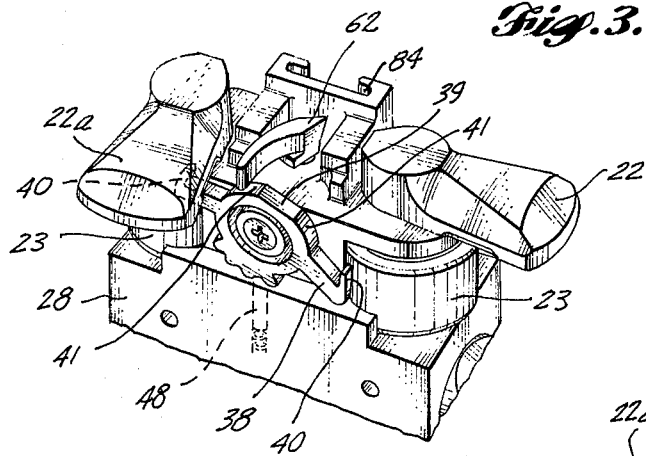
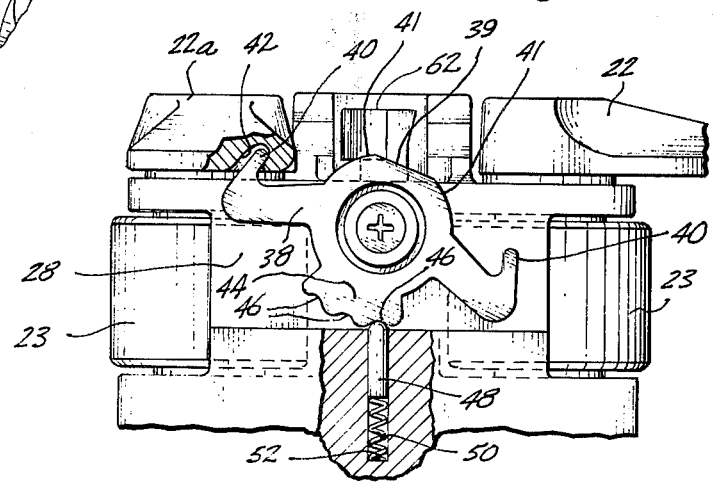

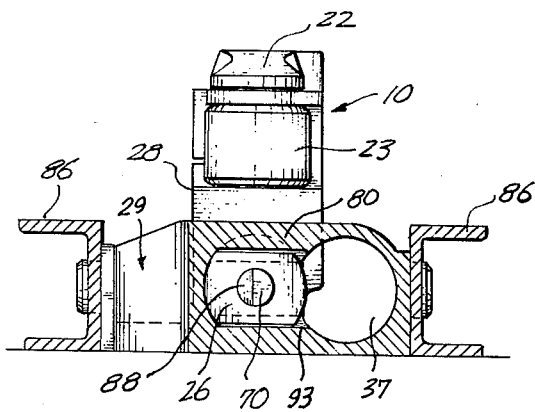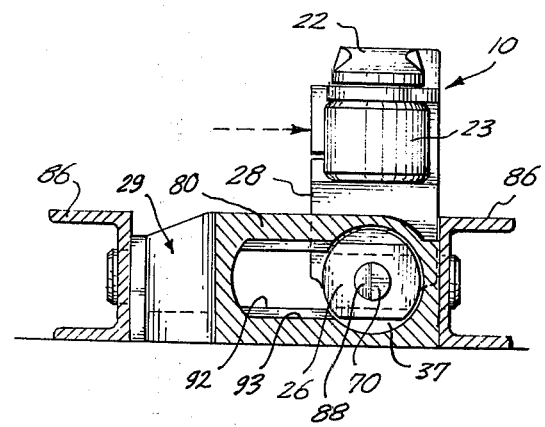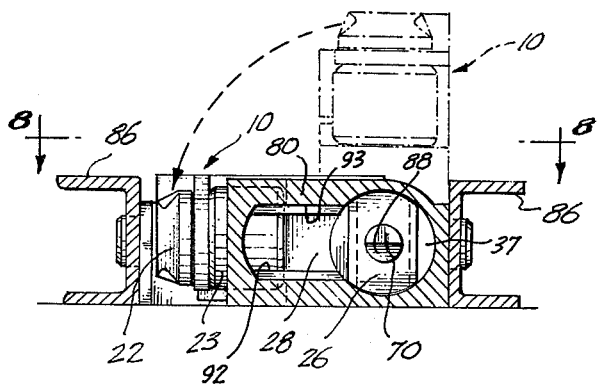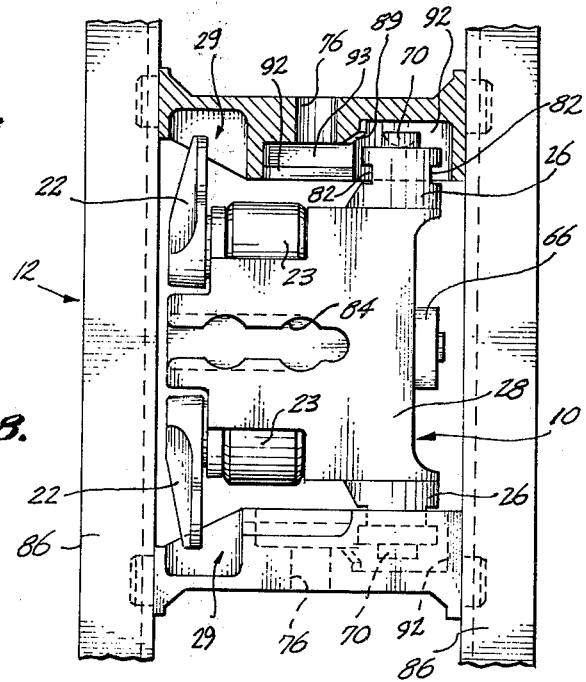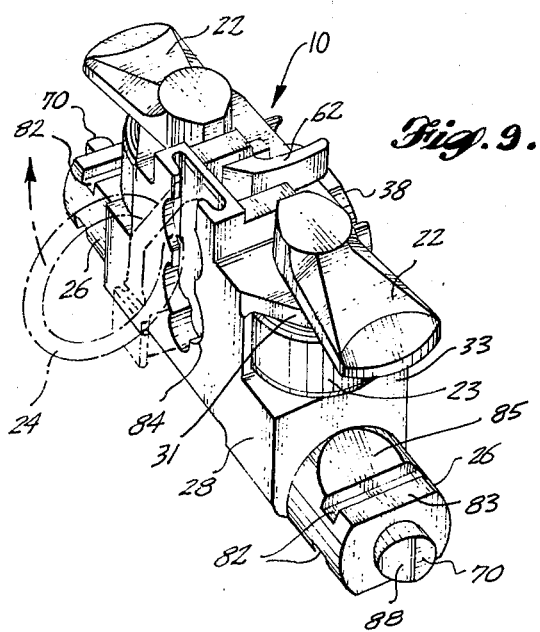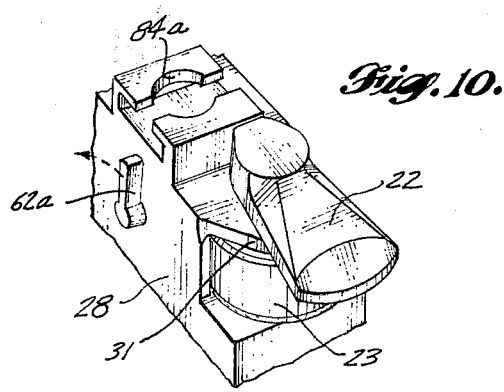

RETRACTABLE CARGO RESTRAINT AND CENTER GUIDE FOR CARGO COMPARTMENTS

BACKGROUND OF THE INVENTION

This invention relates to retractable cargo restraint means and retractable center guide means for cargo handling systems and more particularly to apparatus for guiding, restraining and locating cargo in a cargo compartment. This invention is particularly suited to the wide body style jet aircraft utilized as freighter aircraft or the convertible type aircraft utilized for alternative or simultaneous transport passengers and freight.

PRIOR ART

A system of loading and uloading cargo carrying means such as containers and pallets is shown and disclosed in U.S. Pat. No. 3,714,504 issued to John Alberti and William W. Nanninga on June 26, 1973. This patent sets forth one environment in which this invention finds use. U.S. Pat. No. 3,714,504 is hereby incorporated by reference as if set forth fully herein.

In cargo handling systems on aircraft, especially the "wide body" style of aircraft such as the Boeing 747 there is a requirement for fittings distributed longitudinally along the center line of the cargo deck to support guide rollers which guide the cargo being moved lengthwise or sidewise within the cargo compartment to urge the cargo into its proper loaded position and to aid in removal of the cargo from the cargo compartment. Similarly, there is a need for other fittings to serve as cargo restraints at other locations within the cargo compartment. In addition a center guide means is necessary to restrain the cargo from lateral motion, to help restrain the vertical motion of the cargo once loaded, and to provide an attachment receptacle for cargo tie-down fittings. In prior art devices some or all of these fittings interfere with the motion of cargo during loading or unloading such as, for example, when side loading through main side doors of the cargo compartment is undertaken. In prior art systems the fittings have simply been made removable and maually removed from the system during loading of the cargo whenever such interference takes place. This is, of course, inconvenient and involves the problem of where to place the removed equipment so that it is out of the way but convenient for reinsertion into the system when needed to complete loading of the cargo compartment.

Another cargo restraint device utilized in the prior art is shown in U.S. Pat. No. 3,306,234 issued to Hansen et al., Feb. 28, 1967. This device acts as a securing mechanism for cargo in a cargo compartment; however, it lacks a suitable locking mechanism on the pivot shaft carrying the device and must rely on a track-engaging lock mechanism which is inaccessible whenever cargo is positioned adjacent the forward cargo engaging lip element of the device.

OBJECTS OF THE INVENTION

It is an object of this invention to provide retractable cargo restraints and center guide means for cargo compartments which permit cargo pallets or containers to traverse the rectractable cargo restraints and center guide means when retracted and which are easily erected into operative position for cargo restraint purposes.

Another object of this invention is to provide a retractable cargo restraint which may be located at a plurality of erected positions for use with various sized cargo containers or pallets.

It is a further object of this invention to provide a retractable center guide for cargo handling systems having guiding rollers to aid in guiding and positioning cargo.

An additional object of this invention is to provide a retractable center guide means having cargo engaging elements which may be rotated to permit sideways movement of cargo against the retractable center guide means so that movement of cargo during loading and unloading is not impeded by the cargo engaging elements. It is a related object of this invention to provide a retractable center guide means in which the cargo engaging lip elements may be locked into a fore and aft position at substantially 90° to cargo engaging position whereby the cargo engaging lip element is positioned to prevent interference and damage to cargo pallets and containers.

It is a still further object of this invention to provide a retractable cargo restraint means mounted in its cargo engaging attitude midway between beam elements and being releasably attached to permanently mounted cargo tracks in the cargo compartment, the guide means adaped to be disengaged from its mounting, slid sideways, and rotated into a nestled position between the beam elements.

SUMMARY OF THE INVENTION

Retractable cargo restraints and retractable center guide means intended for usage such as a replacement for the automatic vertical restraining and guiding means shown in U.S. Pat. No. 3,741,504 which has been incorporated herein by reference is shown and described herein. The retractable center guide means provides lateral guidance and restraint for movement of cargo into and out of the cargo compartment by means of a plurality of roller elements which are positioned to rotate about a vertical axis. These rollers are mounted in the body of the retractable center guide means and are positioned immediately below the cargo pallet or container engaging lip elements. The cargo engaging lip elements are pivotally mounted in a framework which is in turn positioned in a body attached to the cargo compartment floor framework. The retractable cargo restraints and center guide means are mounted in the body in a fashion to permit, upon disengagement of locking elements, rotation into a retracted position. The cargo engaging elements of the center guide means are normally spring biased into a cargo engaging position however may be locked in a fore and aft position by a pawl type engagement means to prevent interference with passing cargo. When loading the second row of cargo it is desirable to avoid interference with the cargo being inserted into the second row. This is especially the case in the area of the side door since otherwise the cargo engaging elements would directly abut the side of the cargo preventing the rollers from contacting the cargo.

One preferred embodiment of the retractable center guide means includes provisions for side-directed movement of the unit, after retraction of locking elements, into a position in which rotation may be accomplished into a nested position within the body. This preferred embodiment permits location of the retractable center guide means in its erected position midway between beams of of a spanner beam assembly while minimizing the width of the spanner beam assembly necessary to accommodate the vertical height of the retractable center guide means upon rotation into the nested position.

The retractable cargo restraint means may be located at any location in the floor of the cargo compartment and may be erected at one of a plurality of locations along a slotted frame for restraining lateral and vertical motion of cargo pallets or containers. Various sized pallets or containers can thus be accommodated. The retractable cargo restraints and retractable center guide means of this invention may be equipped with cargo tie-down fittings for lashing cargo in place and may be used in conjunction with suitable caster units and rollers to facilitate the positioning of cargo within the cargo compartment.

BRIEF DESCRIPTION OF THE DRAWINGS

The objectives and attributes of this invention noted above will become more readily apparent from an examination of the attached drawings taken in conjunction with the explanatory textual material following.

FIG. 1 shows a perspective view of the retractable center guide means of this invention.

FIG. 2 is a cross-sectional view of a cargo compartment of an aircraft having the apparatus of this invention installed therein.

FIG. 3 is a perspective view of a portion of the apparatus of this invention showing one cargo engaging element in extended position and another cargo engaging element rotated 90° out of cargo engaging position for the purpose of preventing interference with cargo being loaded.

FIG. 4 is a side elevational view of the apparatus shown in FIG. 3 partly broken away to show elements of the invention.

FIG. 7a, 7b, and 7c are cross-sectional view of the apparatus shown in FIG. 6 taken along lines 7—7 thereof to show the various positions of the apparatus in extending in the retracting center guide means.

FIG. 8 is a planned view of the apparatus shown in FIG. 1 wherein the retractable center guide has been rotated into retracted position.

FIG. 9 is a perspective view of the retractable center guide means removed from its operative position as shown in FIG. 1 to expose features of the journal mechanism.

FIG. 10 is a second embodiment of one portion of the apparatus shown in FIG. 9.

DESCRIPTION AND OPERATION OF THE INVENTION

Referring specifically to the drawings wherein like numerals indicate like parts there is illustrated in FIGS. 1 and 3–9, a retractable center guide means comprising a retractable center guide assembly means 10 journaled in a center guide spanner beam assembly 12. The spanner beam assembly 12 is connected by standard shear plunger locks 18 and tension studs (not shown) to a convertible tie-down tracks 14. The tie-down tracks 14 are useful either for cargo holddown purposes or for mounting seats so that the aircraft may be used either as a cargo or passenger craft. Casters 20 are positioned in the spanner beam assembly 12 to provide support for the cargo traversing the cargo area. Roller units may be installed in place of the casters if desired.

Figure 13:
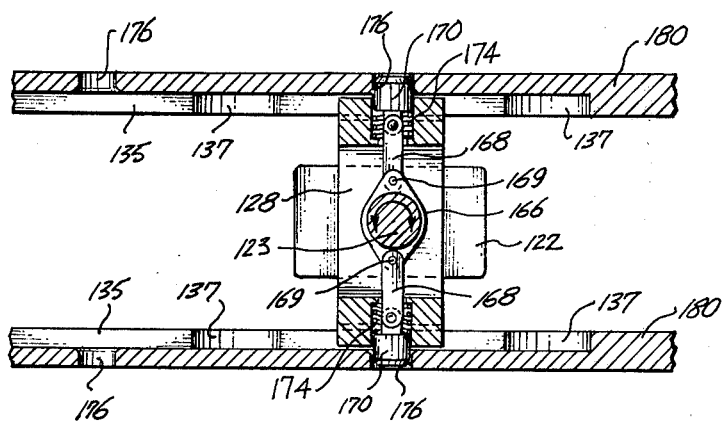
FIG. 13 is a cross-sectional view taken along lines 13—13 of FIG. 12.

The retractable center guide assembly 10 is comprised of a pair of opposed cargo restraint lip elements 22 which are mounted for rotation about a vertical axis and biased into the position shown in FIG. 1. The cargo restraint lip elements 22 may be rotated approximately 90° in either direction against bias imposed by spring element 55 shown in FIG. 5. This spring element is shown herein as a simple helically wound spring member attached at one end to pivot shaft 54 at pin 53 with the other end of spring 55 being attached directly to the restraint housing 28 at rivet 27. An alternate structure suitable for substitution for this spring is shown in U.S. Pat. No. 3,741,504, at FIGS. 13, 14 and 15. The cargo restraint lip elements may thus be rotated in order to permit adjacent cargo pallets and containers to pass without interference or damage to the containers. FIGS. 3 and 4 show the rotation of cargo restraint lip elements 22 and the locking pawl 38 which may be used to lock one or the other of the cargo restraint elements 22 in a rotation position. The retractable center guide assembly is journaled into cross-members 80 and 81 in a manner described in detail below. The cross-members 80 and 81 are firmly connected to the spanner beam assembly 12 by false studs 35.

The tension on pivot shaft 54 is adjusted by the thrust receiving nut 61 which bears upon fixed bushing 60 to counter upwardly directed thrust whenever cargo restraint lip elements 22 are called upon to provide vertical restraint to cargo.

Provision is made on the backside of the retractable center guide assembly for a cargo tie-down fitting receptacle 84 which receives the tie-down fitting 24 including tie-down ring 25. straps and other tie-down hardware and lines may be attached directly to this ring in order to firmly fasten the cargo in place within the cargo compartment.

In FIG. 2 the environment in which the retractable center guide means of this invention is utilized is shown. Cargo containers or pallets 32 are shown positioned on weight bearing caster or roller means 36 and caster 20 which provide the necessary support to the bottom of the containers. Side restraints 34 are shown engaging the bottom of the pallet or container 32 with suitable tie-down fittings 24 adapted to hold the cargo containers in position. The retractable center guide means 10 is shown on the center guide spanner beam assembly 12 in engagement with the cargo container 32. The entire assembly is supported on floor means 29 and surrounded by the cargo aircraft fuselage 30 or other suitable cargo space enclosure.

In FIGS. 3 and 4 one of the cargo restraint lip elements 22a is shown rotated approximately 90° to avoid interference with passing cargo containers. The lockout pawl 38 is rotated into engagement with the cavity 42 whereby hook 40 prevents return of the cargo restraint lip element 22a to its normal position. Lockout pawl 38 is normally biased into a neutral position as shown in FIG. 1, however, it may be rotated as shown in FIGS. 3 and 4 to engage one or the other of cargo restraint lip elements 22. When rotated, the multiple position detent 44 containing dentents 46 first depresses spring plunger pin 48, then permits spring plunger pin 48 to enter an adjacent detent whereby the lockout pawl 38 is held in engagement with cargo restraint element 22. Spring plunger pin travels in cavity 52 and is biased upwardly by spring 50.

The lockout pawl 38 has rounded surfaces 31 thereon which interfere with operation of plunger release lever 62 whenever lockout pawl 38 is rotated from its horizontal position shown in FIG. 1. A flat surface 39 is provided at the neutral position of lockout pawl 38 so that plunger release lever 62 may be operated only when lockout pawl 38 is in its is in its substantially horizontal position.

Figure 5:
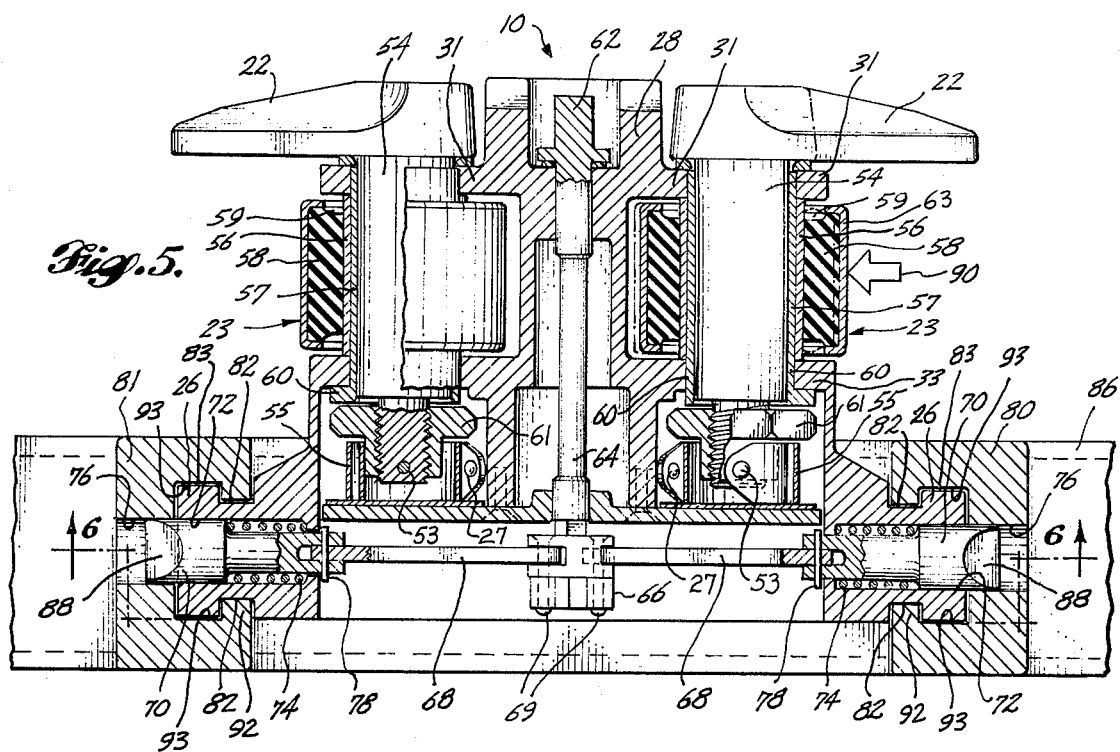
FIG. 5 is a partial side elevational view of the apparatus shown in FIG. 1 having portions thereof broken away.
Figure 6:
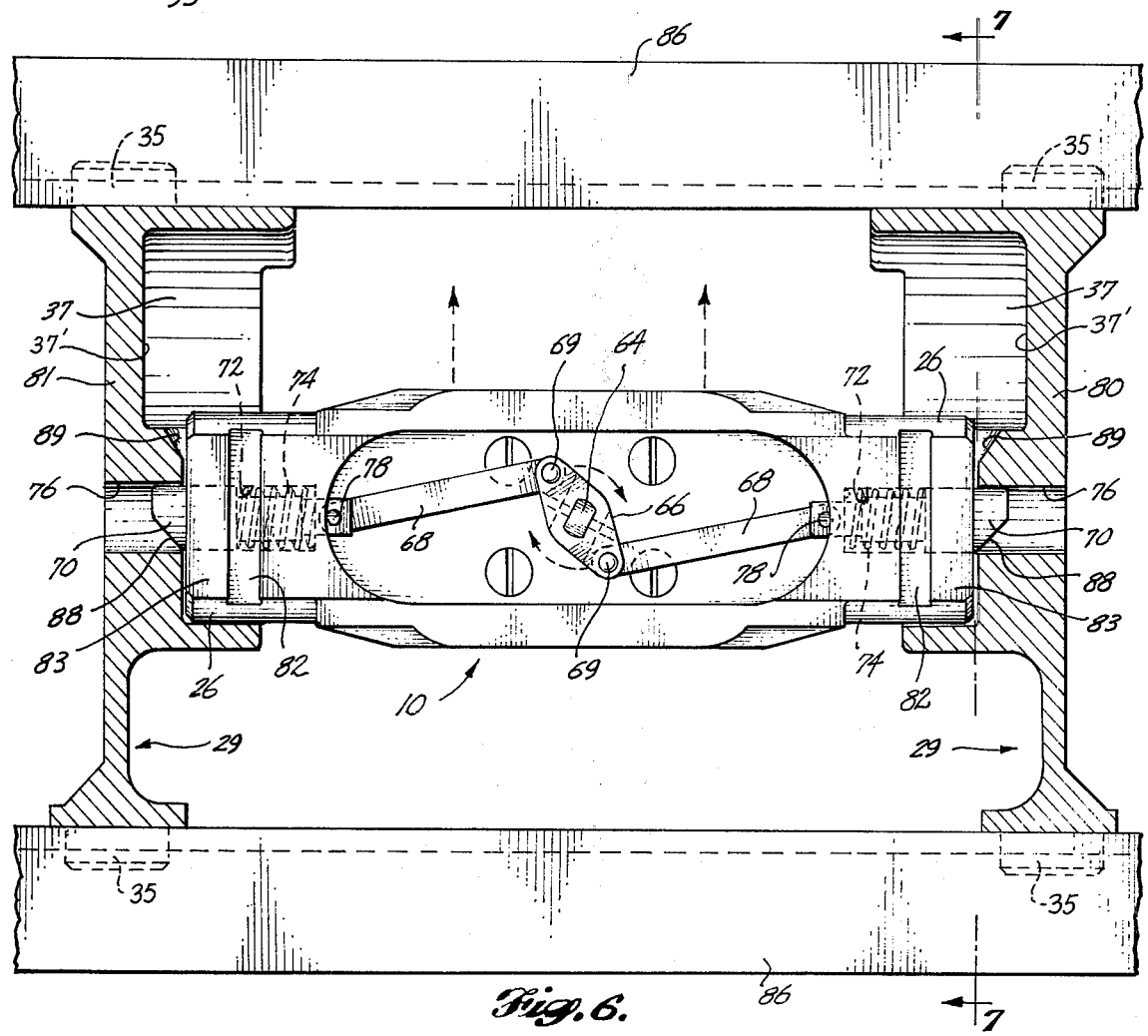
FIG. 6 is a cross-sectional view of the apparatus shown in FIG. 5 taken along lines 6—6 of FIG. 5.

In FIGS. 5 and 6 of the apparatus is shown partly cutaway to show features thereof. Pivot shafts 54 each are surmounted by a cargo restraint lip 22 and are each rotatively mounted within fixed bushings 57 which in turn carry an elastomeric mounted roller means 23. A return spring 55 causes cargo restraint lip element 22 to assume a neutral position as shown in FIG. 1, but permits rotation in either direction through an angle of approximately 90°. Rotation of the cargo restraint element 22 permits cargo to pass the center guide means in contact with roller 23 without being impeded by cargo restraint 22.

The roller means 23 is comprised of a roller inner ring 56 rotatively mounted on fixed bushing 57 for rotation about a vertical axis when the center guide means is erected. An elastomeric core 58 is adhered to the outer surface of roller inner ring 56 and in turn carries roller outer ring 63. The elastomer is so formed with a gap 59 that impact at arrow 90 forces elastic deformation of the elastomer 58 due to sideways impact motion upon the roller. The elastomer is permitted to flex outwardly through gaps 59 without causing permanent deformation of the elastomer. When impact force 90 is relieved, the elastomer returns to the shape shown generally in the cross section of the roller in FIG. 5.

The rectractable center guide assembly shown generally at 10 is journalled into cross-members 80 and 81 on pivot shaft 26. Flat lands 83 on mounting shafts 26 fit slideably but securely within cross-member slots 93 in an antirotation mode whereby any rotational forces upon the retractable center guide 10 causes an interference bind between lands 83 and cross-member slots 93. Similarly, a key slot 92 fits into land groove 82, keying the retractable center guide assembly from side to side movement as well as providing further antirotation restraint.

When erected as shown in FIGS. 1 and 5, locking plungers 70 travel in bore 72 and extend into lock holes 76 to restrain sideways movement of the retractable center guide assembly within its journalled housing. Locking plungers 70 are spring biased outwardly by springs 74 as is best seen in FIGS. 5 and 6 and are retractable within bore 72 by movement of the plunger release lever 62 causing rotation of shaft 64 which carries crank arm 66 at its lower extremity. The crank arms 66 are connected through pivot points 69 to connecting links 68 which in turn pivotally engage locking plungers 70. By rotation of the shaft 64, plungers 70 may be withdrawn from their respective locking apertures 76 to disengage the retractable center guide assembly permitting the assembly to slide sideways such that mounting shafts 26 enter cylindrical recess 37, thus disengaging lands 83 from cross-member slots 93.

Cross-member slots 93 have a beveled surface 89 positioned to engage plunger bevel 88 to force plunger 70 inwardly whenever mounting shafts 26 of the retractable center guide assembly are forced into cross-member slots 93. Recess walls 37' provide axial clearance so that the unit may be moved from side to side to avoid interference with adjacent cargo when unit is being retracted.

In FIGS. 7A, B and C the various positions of the retractable center guide assembly are shown. In FIG. 7A erected position is shown in which mounting shafts 26 are positioned in cross-member slots 93 with locking plunger 70 inserted into aperture 76 (not shown). In FIG. 7B the retractable center guide assembly is shown with its mounting shaft 26 positioned in cylindrical recess 37 wherein rotation of the unit is possible. In FIG. 7C the retractable center guide assembly 10 is shown rotated into its retracted position, nestled within spanner beams 86. Cargo restraints 22 fit into restraint recesses 29 and the entire unit is below the level of the top of spanner beams 86. A top view of the retracted unit is shown in FIG. 8.

In FIG. 9 a perspective view showing the backside of the retractable center guide assembly 10 with mounting shafts 26 exposed to exhibit the parts thereof. A tie-down fitting receptacle 84 is shown with a tie-down fitting 24 in outline which is adapted to receive suitable elongated cargo restraints such as a rope, strap or the like. The fitting receptacle 84 is a standard receptacle designed to receive tie-down fittings well-known in the prior art.

The exposed mounting shafts 26 shown in FIG. 9 include shaft lands 83, slots 82 and tapered portion 85 which when mated with the key slot 92 and cross-member slot 93 shown in other drawings provides the antirotation constraint which maintains the retractable center guide assembly in its erected position. Locking plunger 70 is shown extended in a position it would occupy when the retractable center guide assembly is in the position shown in FIG. 7A. The outermost face of plunger 70 is relieved at plunger bevel 88 as noted above.

In FIG. 10 an alternate embodiment of the retractable center guide assembly is shown in a partial perspective view. In this embodiment the tie-down fitting receptacle 84a is positioned on the top surfaces of the retractable center guide assembly necessitating relocation of the plunger release lever to its position shown at 62a.

Figure 11:
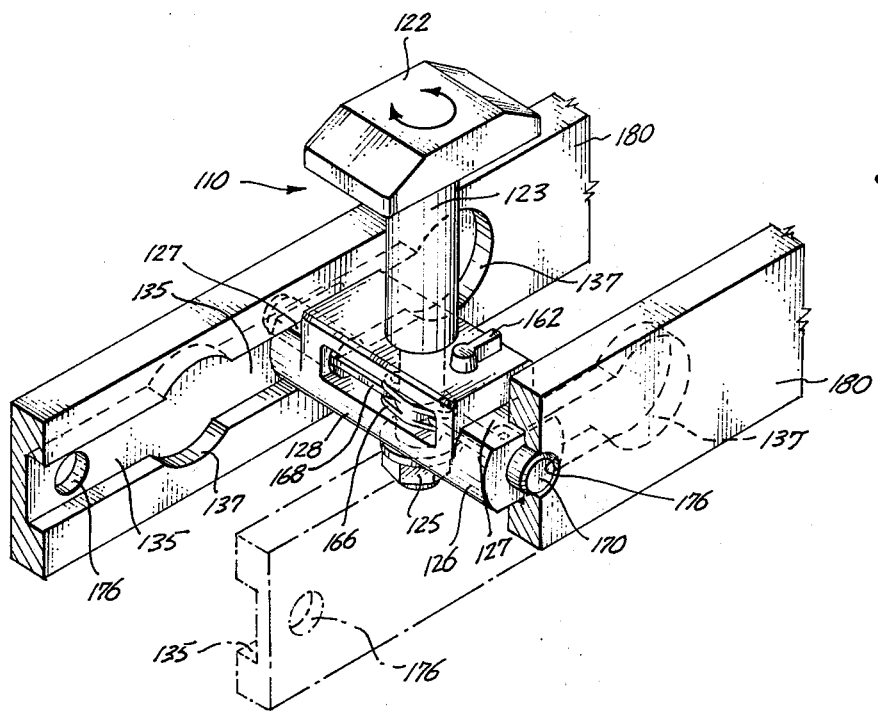
FIG. 11 is a second embodiment of the invention which may be utilized as a simple cargo restraint means without rotatable cargo engaging elements.
Figure 12:
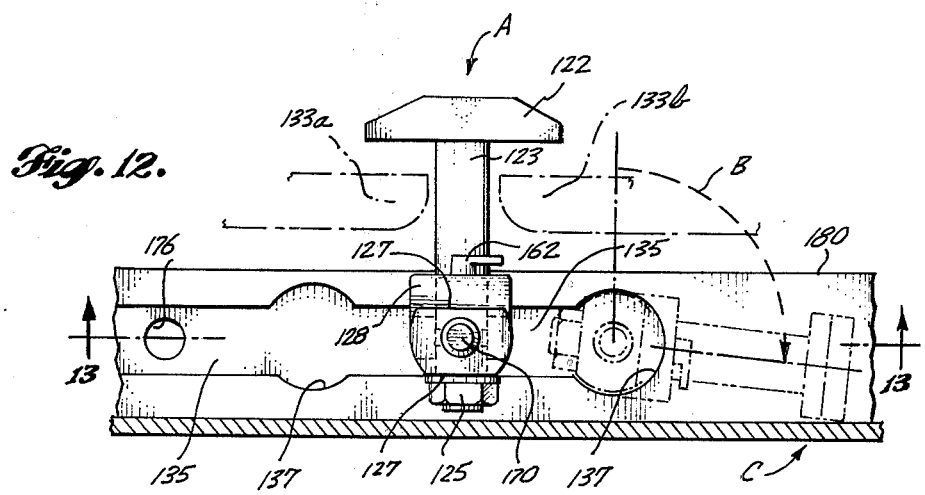
FIG. 12 is a side elevational view of the apparatus shown in FIG. 11.

In FIG. 11 a third embodiment of this invention useful as a simple retractable cargo restraint is shown at 110. The cargo-engaging lip 122 of the retractable cargo restraint is used to engage one edge of a pallet or cargo container to restrain the pallet or cargo container from vertical and horizontal movement. Cargo-engaging lip 122 is mounted on cargo restraint shaft 123 which in turn is journalled into housing 128. An optional locking mechanism is shown which is activated by lock release lever 162 which permits rotation of cargo restraining lip 122 and shaft 123 within housing 128. A linkage comprising crank arm 166, best seen in FIG. 13, and connector links 168 pivotally engage lock plungers 170 so that rotative motion of shaft 123 causes retraction of lock plungers 170 from apertures 176. Lock plungers 170 are biased outwardly by springs 174 urging lock plungers 170 into the position shown in FIGS. 11 and 13. Rotation of the cargo restraint shaft withdraws the lock plungers from the lock holes 176 permitting sideways movement of the unit. Retractable cargo restrain 110 is slidable in cross-member slot 135 in either direction, slots 135 and pivot shaft flat 127 being so sized as to prevent rotation of retractable cargo restraint whenever positioned therein. Cylindrical pivot portion 137 are provided in cross-member slots 135 at various locations to permit rotation of pivot shafts 126 therein so that cargo restraint 110 may be retracted from position A shown in FIG. 12 through the arc shown at B into the position shown generally at C. Rotation is carried out in the direction shown whenever cargo container 133b is removed and the operator wishes to disengage retractable cargo restraint 110 from cargo container 133a. Thus, retractable cargo restraint 110 may be positioned at any one of an number of locations along cross-member slot 135 and may find cylindrical pivot portions of cross-member slot 135 at various locations wherein retraction can be accomplished.

Figure 14:
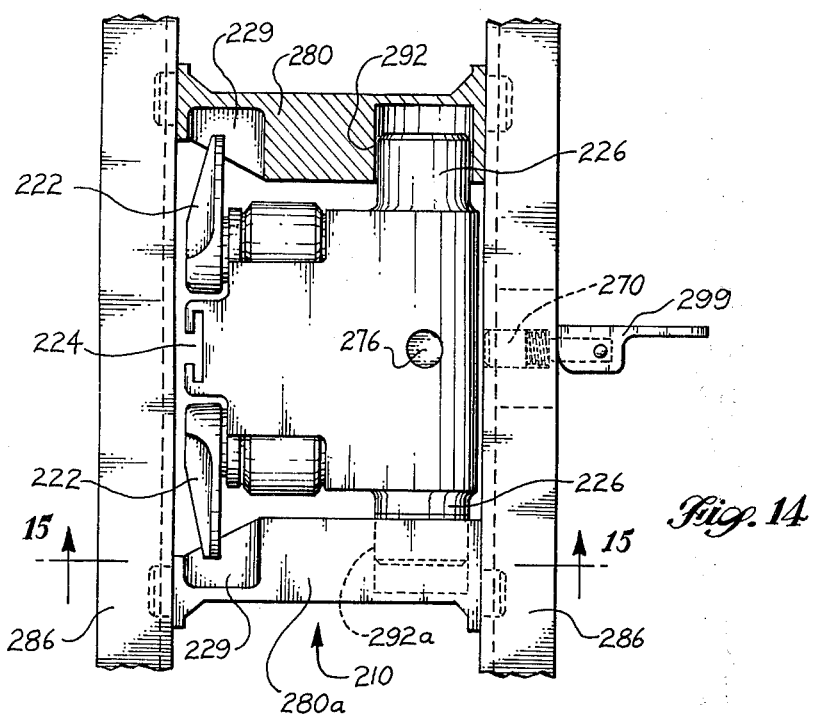
FIG. 14 is a plan view of a third embodiment of the retractable center guide means shown in its retracted position nested between a pair of spanner beams.
Figure 15:
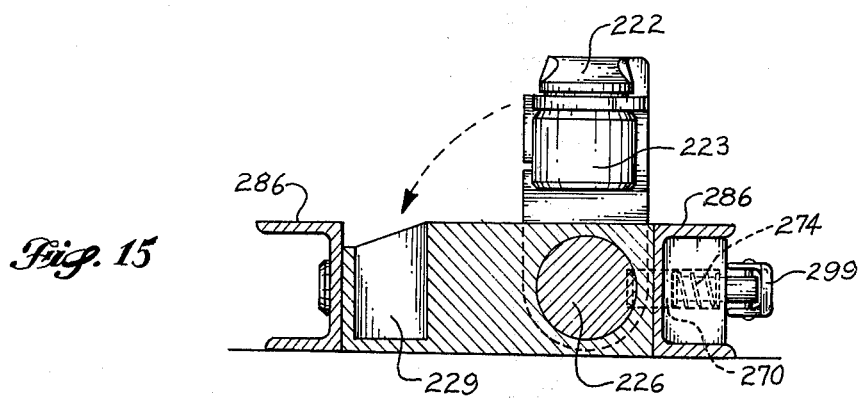
FIG. 15 is a cross-sectional view of the apparatus shown in FIG. 14 taken along line 15—15 thereof with the retractable center guide means shown in erected position.

For applications in which it is unnecessary to have the center guide means positioned centrally between spanner beams, the embodiment shown in FIGS. 14 and 15 may be advantageously utilized. In this embodiment of the invention a retractable center guide means shown generally at numeral 210 is shown journaled into cylindrical recesses 292 and 292a in cross-members 280 and 280a, respectively. A sufficient amount of clearance is provided in the journaled relationship between the cylindrical recesses 292 and 292a and the pivot shaft 226 so that axial motion is permitted to allow clearance for the restraint lips 222 whenever the unit is being retracted or erected with cargo adjacent thereto. Pivot shafts 226 are shown positioned within the above-noted cylindrical recesses. When retracted as shown in FIG. 14, cargo engaging lips 222 fit into lip recesses 229 so that the entire retractable center guide unit is below the level of the upper surface of spanner beams 286. A locking means 299 includes a spring biased retractable plunger 270 which is adapted to index into restraint hole 276. A top-mounted tie-down fitting receptacle 224 may be used for fastening cargo much as described above for other tie-down fittings.

In FIG. 15 the apparatus of FIG. 14 is shown in the erected position with lock means 229 activated permitting extension of spring 274 which in turn forces plunger 270 into engagement with index hole 276.

It will be appreciated by those skilled in the art that an improved retractable cargo restraint and a retractable cargo guide for cargo compartments achieving the above-mentioned and related objectives may be embodied in variant forms within the framework of the inventive concepts disclosed herein. However, the illustrated embodiments are considered to be of optimum form and design so as to achieve these various objectives in a degree which is unique. Thus, while the invention broadly embraces the concept of providing a retractable element for emplacement in the floor area of a cargo compartment which may be erected and put into use in a simple and expedient fashion for the guiding, location, and restraint of cargo, it will be recognized that the unique structure of the locking mechanism cooperating directly with the pivot shaft which carries the cargo restraint elements yields a combination of related advantages especially in secure restraint of cargo which is unique to this art. It will also be noted that the cargo restraint and guide means disclosed herein meets the requirements for guiding cargo into the cargo compartment and restraining the cargo when placed in position yet avoids the attendant prior art problems by virtue of its unique retractability. These and other aspects of the invention including equivalents thereof will be apparent from an understanding of the subject matter as disclosed and as set forth in the claims which follow:

I claim:

1. A retractable cargo restraint means comprising:
   a frame means including horizontal pivot shaft journal means;
   a pivot shaft journaled into said journal means for rotation about a horizontal axis;
   a body positioned on said pivot shaft having cargoengaging lip elements extending outwardly therefrom;
   means to lock said pivot shaft in a position wherein said rotatable body is erect with said cargo engaging lip elements exposed for engagement with securing pockets on cargo pallets or containers, said means to lock said pivot shaft comprising slot means extending from said journal means positioned to receive said pivot shaft and engage lands thereon preventing rotation thereof; and,
   means to receive said body in a retract position within said frame means, said means permitting rotation of said body from an erect position into said retracted position.

2. The apparatus of claim 1 wherein said cargo restraint means is a cargo guide means further comprising:
   at least one roller means positioned on said rotatable body, said roller means having its axis of rotation vertical when said body is in an erect position.

3. The apparatus of claim 1 wherein said rotatable body is slidable horizontally into said groove means.

4. The apparatus of claim 3 wherein said body, when placed in said erect position and locked, is located substantially equally between a pair of spanner beams carrying said frame means.

5. A retractable cargo restraint means for locating and restraining cargo in a cargo area comprising:
   frame means including a spanner beam assembly having a pair of substantially parallel spanner beams therein and having securing means thereon for attachment to floor elements in a cargo compartmemt;
   a pair of cross-members extending between said spanner beams having means therein for receiving a rotatable body;
   a rotatable body having cargo-engaging lip elements positioned at a first end thereof and a pivot shaft means positioned at a second end thereof, said pivot shaft means being journaled into said cross members, said body pivotally rotatable about said pivot shaft from a first retracted position into a second erected position wherein said cargo-engaging lip elements are exposed; and, lock means to restrain said rotatable body in said erect position.

6. The apparatus of claim 5 wherein said cross members further include slot means extending horizontally from said journal means and having a width less than the diameter of said pivot shaft and said pivot shaft having flat lands thereon matable with said groove means, whereby horizontal movement into said slots of said body when erected prevents rotation of said body.

7. The apparatus of claim 6 further including lock means to position said cargo restraint means at its erect operable position and restrain further horizontal motion thereof.

8. The apparatus of claim 5 further including a plurality of roller means on said rotatable body each mounted for rotation about a vertical axis and positioned to engage and guide cargo traversing the cargo compartment when said restraint is in the erect position.

9. The apparatus of claim 5 wherein said cargo engaging lip elements are rotatable to a side directed position to permit cargo to pass without interference and wherein said lip elements are biased into an exposed position extending outwardly from said body.

10. The apparatus of claim 9 and locking pawl means to lock said lip elements in said side directed position.

11. The apparatus of claim 5 having cargo tie-down fitting means positioned on a side of said body.

12. The apparatus of claim 5 having a cargo tie-down fitting means positioned on an end of said body adjacent said lip elements.

13. A retractable cargo restraint means comprising:
a frame means comprising frame elements, each having elongated slot means therein including at least one enlarged cylindrical portion, said cylindrical portion in each frame element being disposed upon a common axis;

a rotatable body having a pivot shaft at one end thereof and cargo restraining lip elements at another end thereof said pivot shaft having flat lands thereon of a width to fit into said slot means and positioned so that said body is erect and restrained from rotation whenever said lands are in said slot, said pivot shaft being sized to pivot within said cylindrical portions;

means to index and hold said body at a cargo restraining location along said slot means.

14. The apparatus of claim 13 wherein said means to index and hold comprises an index hole in said slot means with a retractable plunger means carried by said body and insertable into said hole.

15. The apparatus of claim 14 wherein said plunger means is coaxial with said pivot shaft.

16. The apparatus of claim 1 wherein said journal means includes means for receiving limited axial movement of said pivot shaft.

17. The apparatus of claim 5 wherein said cross-members include means for receiving limited axial movement of said pivot shaft.

18. The apparatus of claim 13 wherein said frame elements include means for receiving limited axial movement of said pivot shaft.

19. A retractable cargo restraint and guide means comprising:

frame means including opposed cross-member elements having pivot shaft receiving means therein, said pivot shaft receiving means having a first cylindrical zone and a second elongated slot zone opening into said first cylindrical zone and having a width less than said first cylindrical zone;

a pivotally mounted body having a pivot shaft at one end, said pivot shaft mounted in said pivot shaft receiving means for rotation in first cylindrical zone and slidable into said second elongate slot;

cargo engaging lip means pivotally mounted on said body for rotation about an axis substantially perpendicular to said pivot shaft and positioned at a second end of said body remote from said pivot shaft;

means to lock said pivotally mounted body in an upright position when said pivot shafts are positioned in said elongated slot zone.

* * * * *